United States Patent [19]
Ikemori

[11] Patent Number: 4,953,195
[45] Date of Patent: Aug. 28, 1990

[54] PRIVATE BRANCH EXCHANGE SYSTEM WITH SPECIFIC INFORMATION TRANSMITTING FUNCTION

[75] Inventor: Kimio Ikemori, Hino, Japan

[73] Assignee: Kabushiki Kaisha Toshiba, Kawasaki, Japan

[21] Appl. No.: 388,158

[22] Filed: Aug. 1, 1989

[30] Foreign Application Priority Data
Aug. 8, 1988 [JP] Japan .................................. 63-196088

[51] Int. Cl.⁵ ............................................. H04M 3/08
[52] U.S. Cl. .......................................... 379/33; 379/9; 379/88; 379/26; 370/13
[58] Field of Search ........................ 379/32, 33, 67, 89, 379/88, 1, 9, 14, 22, 26; 370/13

[56] References Cited
U.S. PATENT DOCUMENTS
4,347,607  8/1982  Nixon et al. ........................ 379/33 X Primary Examiner—James L. Dwyer
Attorney, Agent, or Firm—Oblon, Spivak, McClelland, Maier & Neustadt

[57] ABSTRACT

A private branch exchange system connects a plurality of extension terminals to a digital network via a digital trunk circuit and a channel service unit. When a failure occurs between the digital trunk circuit and the digital network, a message generation instruction is generated. In response to the message generation instruction, a message generator in the digital trunk circuit generates a message. The generated message is transmitted to a specific extension terminal of the extension terminals.

23 Claims, 13 Drawing Sheets

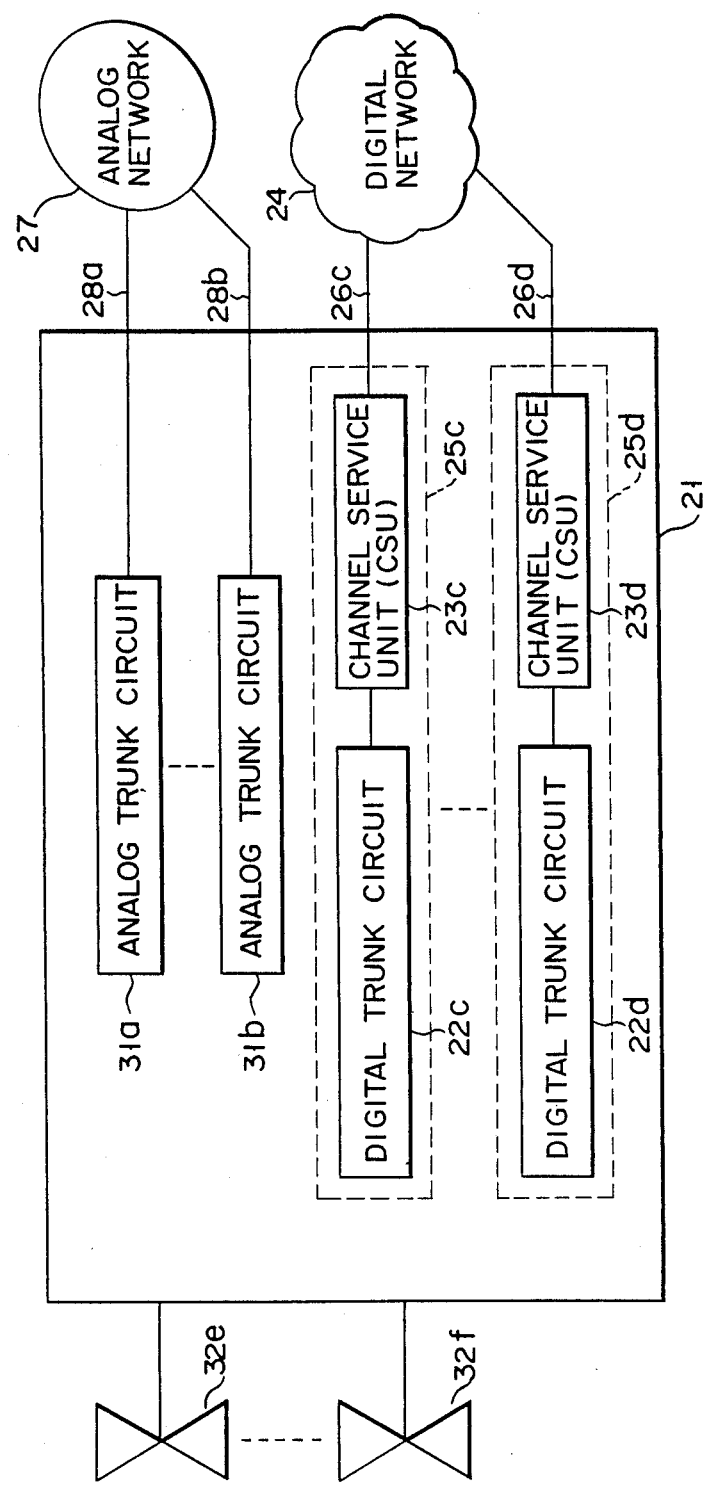
F I G. 1

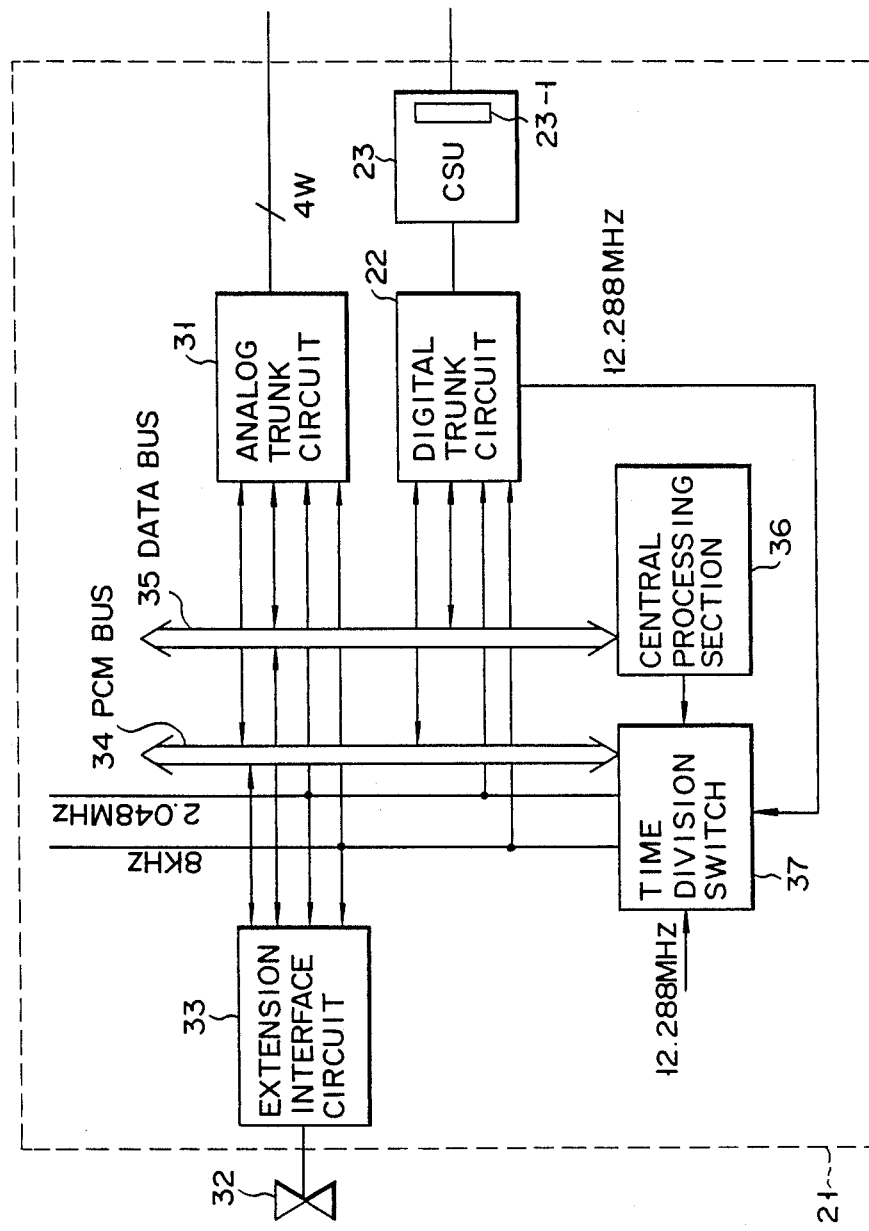
F I G. 2

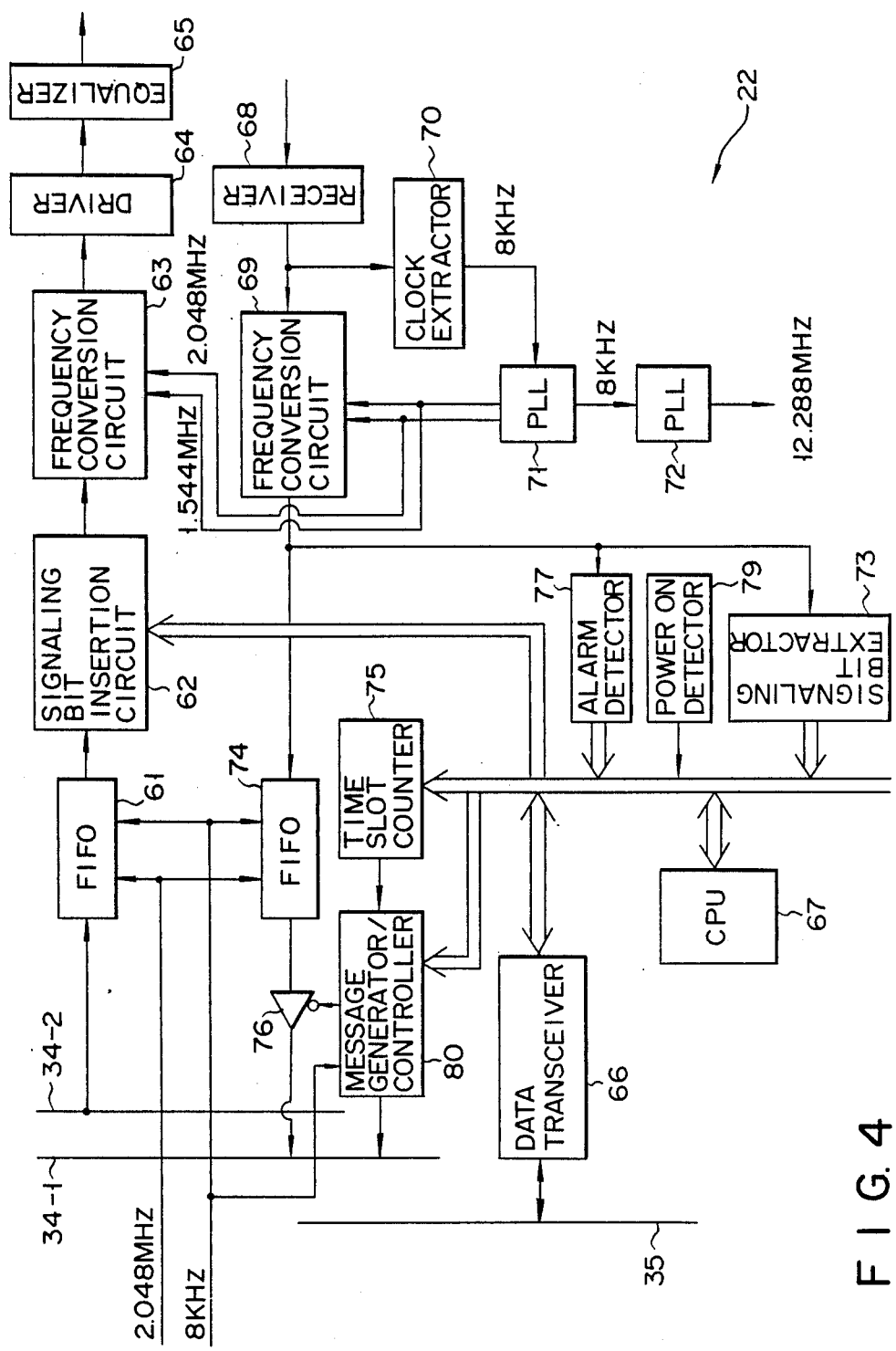
F I G. 4

SIGNALING BITS = F6, F12

SYNC BIT　　　　SECOND BITS = "O"

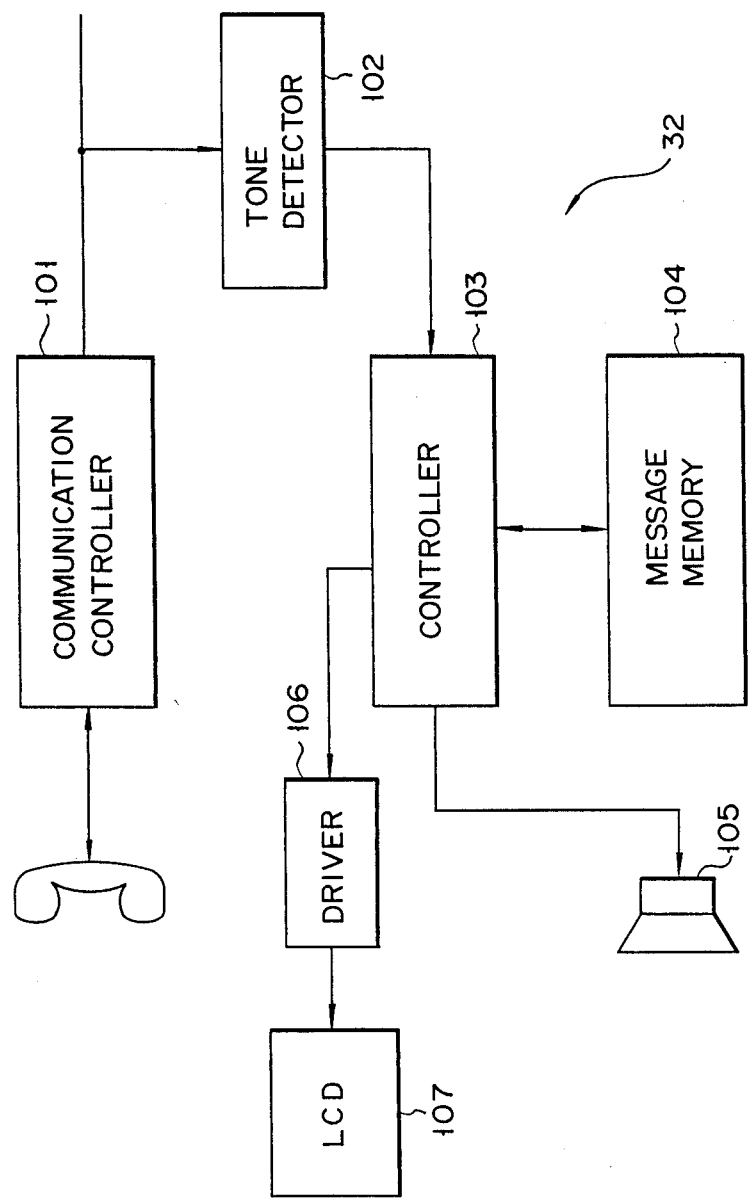
F I G. 13

PRIVATE BRANCH EXCHANGE SYSTEM WITH SPECIFIC INFORMATION TRANSMITTING FUNCTION

BACKGROUND OF THE INVENTION

1. Field of the Invention

The present invention relates to a digital line interface section in a private branch exchange system connected to a digital network and, more particularly, to a private branch exchange system having a specific information transmitting function by means of which information indicating the occurrence of a failure between a digital line interface section and a digital line can be transmitted.

2. Description of the Related Art

In a conventional digital private branch exchange system, a private branch exchange is connected to a digital network via a digital line interface including a digital trunk circuit and a channel service unit.

When speech data input from an extension terminal is to be transmitted from an extension interface circuit to a digital trunk circuit, the speech data output from the extension interface circuit is PCM-converted, switched from an input to output highway by a time division switch, and transmitted to the digital trunk circuit. Transmission of the speech data is repeatedly performed for each sync signal having a frequency of 8 kHz. Thereafter, the speech data is transmitted onto the digital line in a multiframe manner via the digital trunk circuit and the channel service unit.

Reception data of a multiframe format from the digital line via the channel service unit is converted into data synchronous with a 2.048-MHz clock signal by the digital trunk circuit. The speech data in the converted data is switched from the input to output highway by the time division switch and transmitted to the extension terminal via the extension interface circuit.

When communication is to be performed by using the digital line as described above, a failure such as step-out may occur between the channel service unit and the digital line. In the conventional private branch exchange system, however, specific information cannot be generated to alarm occurrence of a failure to the terminal. Therefore, the failure cannot be detected until communication actually starts. That is, when a failure occurs during communication, not only the communication is interrupted, but also the type and location of the failure cannot be recognized from the extension terminal, resulting in poor service.

SUMMARY OF THE INVENTION

The present invention has been made in consideration of the above situation and has as its object to provide a private branch exchange system with a specific information transmitting function capable of generating specific information and alarming, and when a failure occurs between a digital line interface section and a digital network, capable of reliably alarming occurrence of the failure to an extension terminal.

In order to achieve the above object of the present invention, a private branch exchange system for connecting a plurality of extension terminals to a digital network via a digital trunk circuit and a channel service unit, includes message generating means, located in the digital trunk circuit, for generating a message in response to an input message generation instruction, and transmitting means for transmitting the message to a specific extension terminal of the plurality of extension terminals in response to the message generation instruction. The message generation instruction is generated when a failure occurs or a power source is switched on.

In addition, in order to achieve the above object of the present invention, a method of alarming occurrence of a failure between a digital trunk circuit and a digital network to an extension terminal in a private branch exchange system, comprises:

performing communication between the extension terminal and the digital network;

monitoring occurrence of a failure during communication; and alarming occurrence of a failure to the extension terminal when the failure is detected.

As described above, according to the private branch exchange system of the present invention, when a failure occurs between the digital circuit interface section and the digital network, for example, occurrence of the failure can be recognized from the extension terminal by a sound message or the like.

BRIEF DESCRIPTION OF THE DRAWINGS

FIG. 1 is a block diagram showing a schematic arrangement of a digital private branch exchange system;

FIG. 2 is a block diagram showing in detail the arrangement of the private branch exchange system;

FIG. 4 is a block diagram showing an arrangement of a digital trunk circuit shown in FIG. 2;

FIG. 13 is a block diagram showing an arrangement of an extension terminal; and

DETAILED DESCRIPTION OF THE PREFERRED EMBODIMENTS

Figure 3:
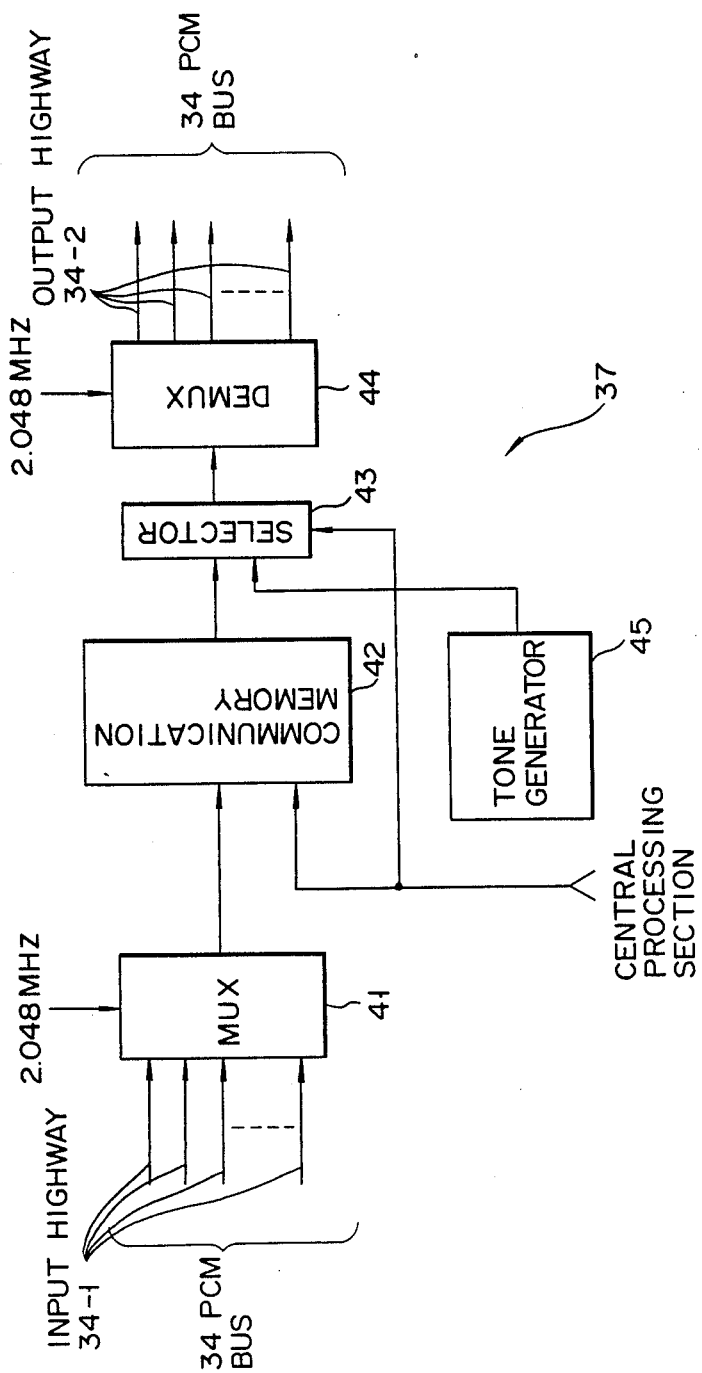
FIG. 3 is a block diagram showing a schematic arrangement of a time division switch shown in FIG. 2.

An embodiment of a private branch exchange system with a specific information transmitting function according to the present invention with reference to the accompanying drawings will be described in detail below.

FIG. 1 shows a schematic arrangement of a private branch exchange system with a specific information transmitting function according to the present invention. A digital private branch exchange system includes a private branch exchange 21, and extension terminals (telephone sets) 32e, ..., 32f, an analog network 27, and a digital network 24, which are connected to the private branch exchange 21. The branch exchange 21 includes a plurality of analog trunk circuits 31i (i=a, . . . , b) and a plurality of digital line interface sections 25j including digital trunk circuits 22j (j=c, . . . , d) and channel service units (CSUs) 23j. The channel service unit is called an NT (network termination) in the ISDN system. Each digital line interface section 25j is connected to the digital network 24 via a digital line 26j. Each analog trunk circuit 31i is connected to the analog network 27 via an analog line 28i.

The private branch exchange 21 is arranged as shown in FIG. 2. Referring to FIG. 2, the branch exchange 21 includes only analog and digital trunk circuits 31 and 22, an extension interface circuit 33, a central processing section 36, a time division switch 37, and an extension terminal 32, for the sake of illustrative simplicity. The analog and digital trunk circuits 31 and 22 and the extension terminal 32 correspond to the analog and digital trunk circuits 31a and 22c and the extension terminal 32e shown in FIG. 1, respectively. The circuits 22 and 31 and the extension interface circuit 33 connected to the terminal 32 are connected to a PCM bus 34 and a data bus 35 as serial buses, respectively. The channel service unit 23 includes a circuit 23-1 for changing a pattern of a signaling bit when a failure such as step-out occurs.

The PCM bus 34 includes a plurality of input highways 34-1 and a plurality of output highways 34-2 (both to be described later). The circuits 22, 31, and 33 receive data from the output highways 34-2 and transmit data onto the input highways 34-1. The extension interface circuit 33 processes data from the output highway 34-2 and outputs the processed data to the terminal 32. In addition, the circuit 33 processes data from the terminal 32 and outputs the processed data onto the input highway 34-1. The digital trunk circuit 22 converts data supplied from the output highway 34-2 and sends the converted data to the digital network 24 via the channel service unit 23d and the digital line 26d. In addition, the circuit 22 converts data supplied from the network 24 via the line 26d and the unit 23d and sends the converted data onto the input highway 34-1. The analog trunk circuit 31 sends input data to the analog network 27 via the analog line 28a and sends input data from the network 27 onto the input highway 34-1.

The central processing section 36 exchanges control data representing an on-hook operation, an off-hook operation, an outgoing call, an incoming call, and the like with the respective circuits via the data bus 35 and controls operations of these circuits and the time division switch 37. When a clock sync signal of a frequency of 12.288 MHz is supplied from the digital trunk circuit 22, the switch 37 outputs a 2.048-MHz clock signal and an 8-kHz sync signal to each circuit on the basis of this 12.288-MHz clock sync signal. In addition, when the switch 37 receives data from the respective circuits via the input highways of the PCM bus 34, it transfers these data to the circuits via the output highways of the bus 34 by using a time slot designated by switch control data from the section 36.

An arrangement of the time division switch 37 shown in FIG. 2 is shown in FIG. 3 in detail. Referring to FIG. 3, the input highways 34-1 of the PCM bus 34 are connected to a multiplexer 41. A plurality of time divisionally multiplexed speech data are transmitted from the respective circuits to the highways 34-1. In accordance with the 2.048-MHz clock signal, the multiplexer (MUX) 41 sequentially selects the speech data on the highways 34-1, and further time divisionally multiplexes and outputs the selected speech data to a communication memory 42. The memory 42 stores the speech data sequentially input from the MUX 41 in write addresses predetermined in correspondence with the highways 34-1.

The speech data stored in the memory 42 are read out in an order of read addresses designated by the central processing section 36 and output to a selector 43. A tone generator 45 generates various service tones. In accordance with a selection command from the section 36, the selector 43 selects one of tone data from the generator 45 and speech data read out from the memory 42 and sequentially supplies the selected data to a demultiplexer (DEMUX) 44. The DEMUX 44 selectively sends the data from the selector 43 to the output highways 34-2 of the PCM bus 34. In this manner, a plurality of time divisionally multiplexed data are transmitted to the highways 34-2.

FIG. 4 shows an arrangement of the digital trunk circuit 22 in detail. A FIFO circuit 61 receives speech data from the output highways 34-2 of the PCM bus 34 and temporarily stores the data. Thereafter, the circuit 61 outputs the stored data to a signaling bit insertion circuit 62. The circuit 62 inserts input signaling bits into a predetermined position of the speech data and outputs the data to a frequency conversion circuit 63. The circuit 63 converts 8-bit speech data synchronous with a 2.048-MHz clock signal into 8-bit speech data synchronous with a 1.544-MHz clock signal. The converted speech data is output as transmission data of a multiframe format to a driver 64. The driver 64 converts the speech data into a bipolar code string and outputs the code string to an equalizer 65. The equalizer 65 corrects a waveform of the code string and then transmits the code string as transmission data to the channel service unit 23c. The unit 23c sends the transmission data to the digital network 24.

A data transceiver 66 receives control data representing an on-hook operation, an off-hook operation, an outgoing call, an incoming call, and the like from the central processing section 36 and sends the control data to a CPU 67. When the CPU 67 receives the control data, it converts a format of the control data so that the control data can be inserted into a multiframe, and sends the format-converted control data as the signaling bits to the signaling bit insertion circuit 62. The circuit 62 receives the signaling bits and inserts the control data into the 6th and 12th frames of the multiframe. Thereafter, the speech data and control data sent from the signaling bit insertion circuit 62 are transmitted to the channel service unit 23c via the frequency conversion circuit 63, the driver 64, and the equalizer 65, as described above.

Reception data of a multiframe format sent from the channel service unit 23 via the digital line 26 is supplied to a frequency conversion circuit 69 and a clock extractor 70 via a receiver 68 of the digital trunk circuit 22. The extractor 70 extracts an 8-kHz signal from the reception data and supplies the extracted signal to a PLL circuit 71. On the basis of the 8-kHz signal extracted from the reception data, the circuit 71 reproduces an 8-kHz sync signal and forms 1.544- and 2.048-MHz clock signals. The circuit 71 supplies the reproduced 8-kHz sync signal to a PLL circuit 72 and supplies the 1.544- and 2.048-MHz clock signals to the frequency conversion circuits 63 and 69. On the basis of the 8-kHz sync signal, the circuit 72 forms a sync clock signal of a frequency of substantially 12.288 MHz and sends this sync clock signal to the time division switch 37 shown in FIG. 2. In this manner, the private branch exchange 21 and the channel service unit 23 operate in synchronism with each other.

When the circuit 69 receives the reception data via the receiver 68, it converts the reception data synchronous with the 1.544-MHz clock signal into data synchronous with the 2.048-MHz clock signal. This converted data includes the signaling bits and the speech data. The circuit 69 outputs the signaling bits to a signaling bit extractor 73 and an alarm detector 77 and outputs the speech data to a FIFO circuit 74.

The extractor 73 extracts the control data from the signaling bits and sends the extracted control data to the CPU 67. When the CPU 67 receives the control data, it converts a format of the control data so that the control data can be transmitted to the data bus 35, and sends the converted control data to the data transceiver 66. The transceiver 66 receives the converted control data and transmits the control data to the data bus 35. In this manner, the control data is supplied to the central processing section 36 shown in FIG. 2 via the data bus 35. When the alarm detector 77 determines occurrence of a failure from the pattern of the signaling bits, it alarms this to the CPU 67. When a power-on detector 79 detects a power-on operation, it outputs check control data to the CPU 67. As in the case of the control data, the CPU 67 supplies failure occurrence indication data and the check control data to the central processing section 36. In accordance with the input control data, failure occurrence indication data, and incoming call control data, the section 36 controls the respective circuits shown in FIG. 2.

Figure 5:
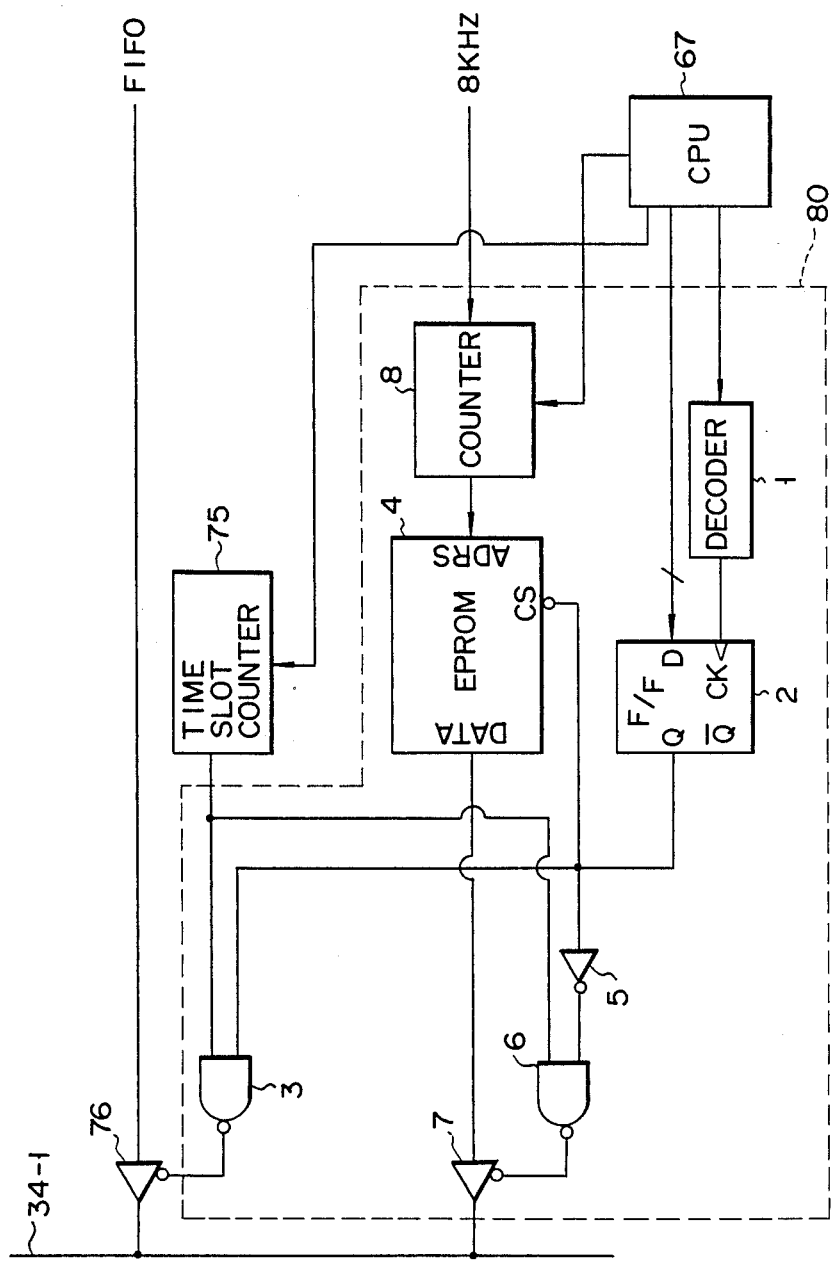
FIG. 5 is a block diagram showing an arrangement of a message generator/controller shown in FIG. 4.

The FIFO circuit 74 receives and temporarily stores the speech data. A time slot counter 75 represents a time slot corresponding to a channel on the input highway 34-1 assigned to the digital trunk circuit 22 by the section 36. The circuit 74 generates a time slot signal at a timing of this time slot and outputs the signal to a message generator/controller 80. As shown in FIG. 5, the message generator/controller 80 includes a decoder 1, a flip-flop (F/F) 2, NAND gates 3 and 6, a speech memory (EPROM) 4, an inverter 5, and a tristate buffer 7. When a failure of, e.g., step-out occurs between the channel service unit 23 and the digital network 24 while the extension terminal 32 connected to the extension interface circuit 33 is in communication via the digital trunk circuit 22, a multiframe including the signaling bits as alarm data is transmitted from the unit 23 to the circuit 22. This alarm data is detected by the alarm detector 77 shown in FIG. 4. When the detector 77 detects the alarm data, it sends failure occurrence indication data to the CPU 67. When the CPU 67 receives the failure occurrence indication data, it determines that a failure has occurred between the unit 23 and the network 24 and outputs a communication stop instruction and a signal of logic "0" to the decoder 1 and the F/F 2, respectively. In response to the communication stop instruction, the decoder 1 generates and supplies a clock to a CK terminal of the F/F 2. Therefore, an output from a Q terminal of the F/F 2 is inverted to be logic "0". As a result, the NAND gate 3 is disabled, a time slot signal from the time slot counter 75 is not supplied to the tristate buffer 76, and the buffer 76 is not enabled. Therefore, the speech data from the FIFO circuit 74 is not sent to the input highways 34-1 via the buffer 76.

An output signal of logic "0" from the Q terminal of the F/F 2 is supplied to a CS terminal of the speech memory (EPROM) 4 and the inverter 5. The inverter 5 receives the logic-"0" signal and supplies a logic-"1" signal to the NAND gate 6. Therefore, the NAND gate 6 is enabled. For this reason, the time slot signal from the counter 75 is supplied to the tristate buffer 7 via the NAND gate 6, and the buffer 7 is enabled at a time slot corresponding to one channel of the input highways assigned to the digital trunk circuit 22. The speech memory 4 receives the logic-"0" signal from the F/F 2 as an enable signal at the CS terminal and outputs stored contents in accordance with the enable signal. The memory 4 stores in advance a speech message representing that a failure has occurred between the channel service unit 23 and the digital network 24. The speech message is sampled at a sampling period of 8 kHz, converted into 8-bit PCM-coded speech data for each sampling operation, and then stored. Assuming that the memory 4 has a memory capacity of, e.g., 256 Kbits, a 4-sec speech message can be stored.

When the memory 4 is enabled to generate an output by the logic-"0" signal supplied to the CS terminal, it sequentially outputs speech data at an address designated by the counter 8 to the tristate buffer 7. That is, when the CPU 67 receives the failure occurrence indication data, it outputs a message start address to the counter 8. The counter 8 receives an 8-kHz sync signal and sequentially designates an address in the speech memory 4 in synchronism with this sync signal. In response to this, the memory 4 sequentially outputs speech data at the designated address, thereby sending the speech message. A message to be read out from the memory 4 can be selected by the start address supplied from the CPU 67. At this time, as described above, the tristate buffer 7 is enabled at a time slot occupied by one channel of the input highway assigned to the digital trunk circuit 22, and this time slot is repeated at a period of 8 kHz. Therefore, the speech data from the speech memory 4 is transmitted to the input highway 34-1 via the buffer 7. The speech data is supplied to the time division switch 37 shown in FIG. 2 and transmitted to the extension terminal 32 via the extension interface circuit 33. As a result, a speech message corresponding to the speech data can be heard at the terminal 32, and a service man can reliably understand from this speech message that a failure has occurred between the channel service unit 23 and the digital network 24.

Figure 9:
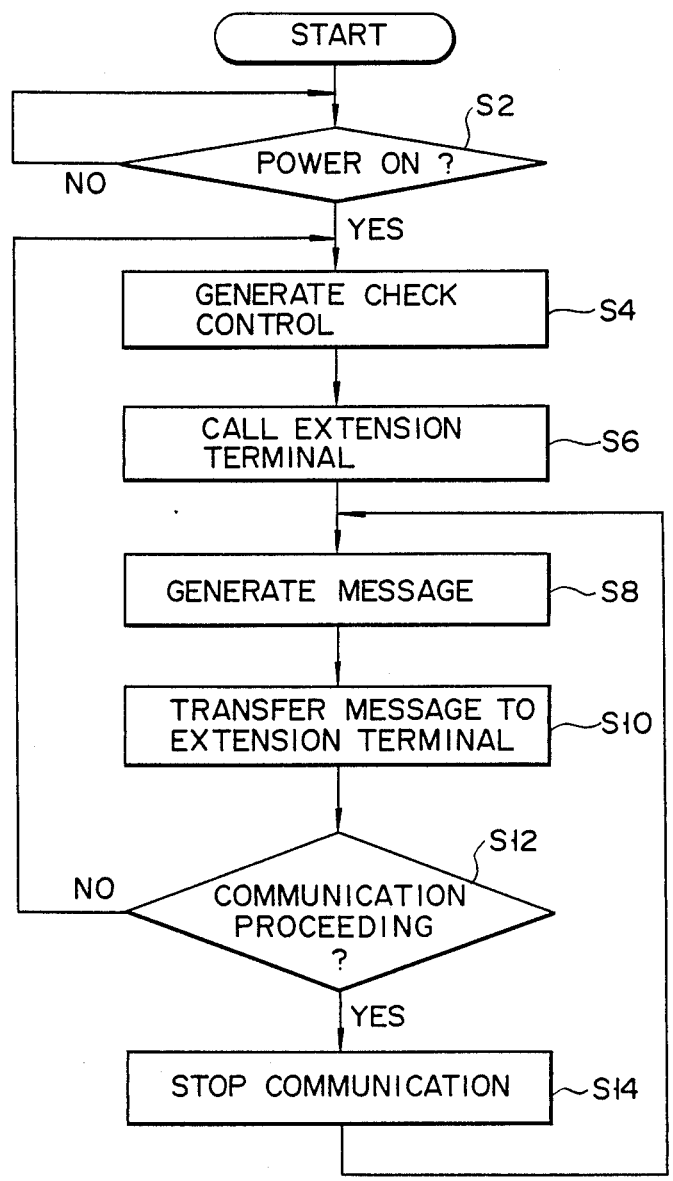
FIG. 9 is a flow chart for explaining an operation of the embodiment.

An operation of the first embodiment will be described below with reference to FIG. 9.

Assume that a power source is switched on for the first time after the private branch exchange 21 is installed. At this time, Y (YES) is determined in step S2, and step S4 is executed. In step S4, the power-on detector 79 outputs check control data to the CPU 67. In response to the check control data, the CPU 67 alarms reception of an incoming call to the central processing section 36. As a result, in step S6, a state in which the extension terminal 32 can be externally called is made, and a transmission path is formed between the terminal 32 and the digital trunk circuit 22. At this time, a specific extension terminal of a plurality of terminals is selected.

In step S8, the alarm detector 77 checks a line state from a frame including signaling bits. For example, step-out can be checked from a sync flag, and another failure can be checked from the signaling bits. On the basis of the check result, alarm data is output to the CPU 67. The CPU 67 outputs a message transmission stop instruction, a logic-"0" signal, and an address determined in accordance with the alarm data to the decoder 1, the F/F 2, and the counter 8, respectively. As a result, a message is generated from the speech memory 4 and transmitted to the terminal 32 via the PCM bus 34. With the above operation, a service man can check upon installation whether the private branch exchange is correctly installed.

Thereafter, when a failure occurs while the digital trunk circuit 22 is not used, the processing from steps S4 to S10 is repeated.

Figure 6:
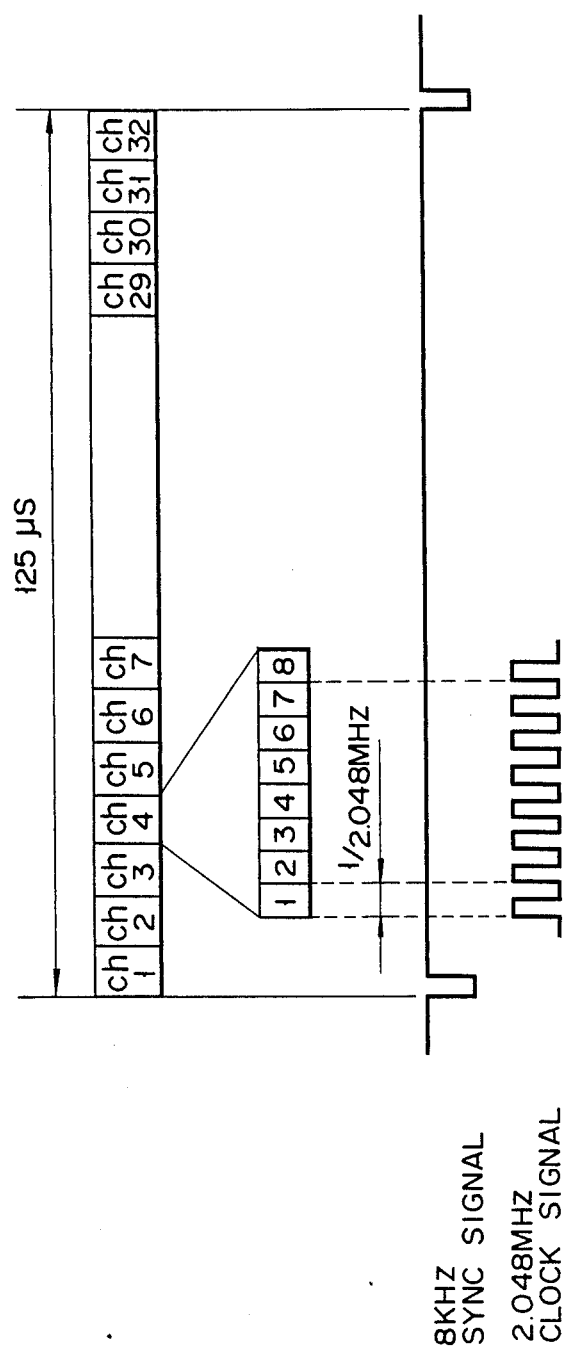
FIG. 6 is a view showing a format of a frame on a PCM bus.

In order to transmit speech data from the extension terminal 32 via the digital trunk circuit 22 and the digital network 24, the speech data output from the terminal 32 via the extension interface circuit 33 is supplied onto the input highway 34-1 of the PCM bus 34 by using a channel assigned to the circuit 33. FIG. 6 shows a data format of the speech data transmitted onto the highway 34-1 of the bus 34. This speech data is an 8-bit PCM code string synchronous with a 2.048-MHz clock signal. 32-channel speech data is time divisionally multiplexed in one frame, and this frame is repeatedly transmitted for each 8-kHz sync signal. Speech data on the output highway 34-2 has a similar format.

In order to transmit speech data from the extension interface circuit 33 to the digital trunk circuit 22, the speech data is supplied to the FIFO circuit 61 via the time division switch 37 and then transmitted from the circuit 61 to the signaling bit insertion circuit 62. Format conversion is performed for communication control data representing an on-hook operation, an off-hook operation, and the like received by the transceiver 66 from the data bus 35. The format-converted communication control data is transmitted to the circuit 62. The circuit 62 inserts the format-converted control data into 6th and 12th frames F6 and F12, respectively, of a multiframe. The speech data multiframe in which the signaling bits are inserted is converted into an 8-bit speech data synchronous with a 1.544-MHz clock signal by the frequency conversion circuit 63. The converted speech data is transmitted as transmission data to the channel service unit 23 via the driver 64 and the equalizer 65. The unit 23 sends the transmission data to the digital network 24.

Figure 7A:
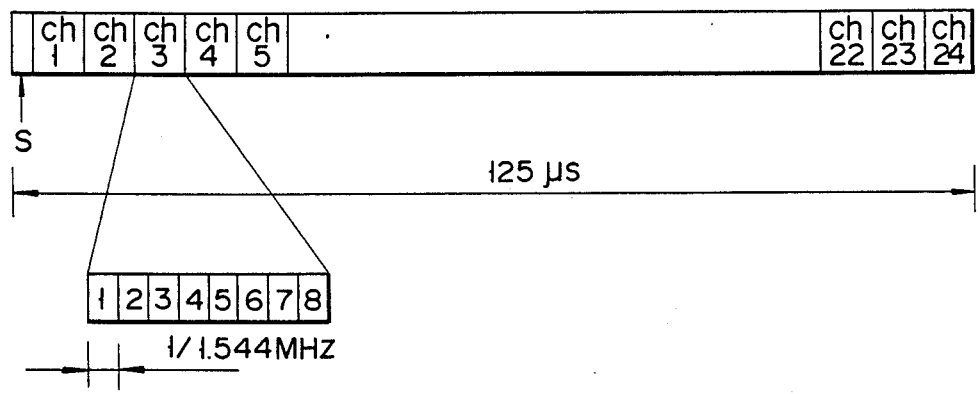
FIGS. 7A to 7C are views showing formats of multiframes used in communication between the digital trunk circuit and a channel service unit.
Figure 7B:
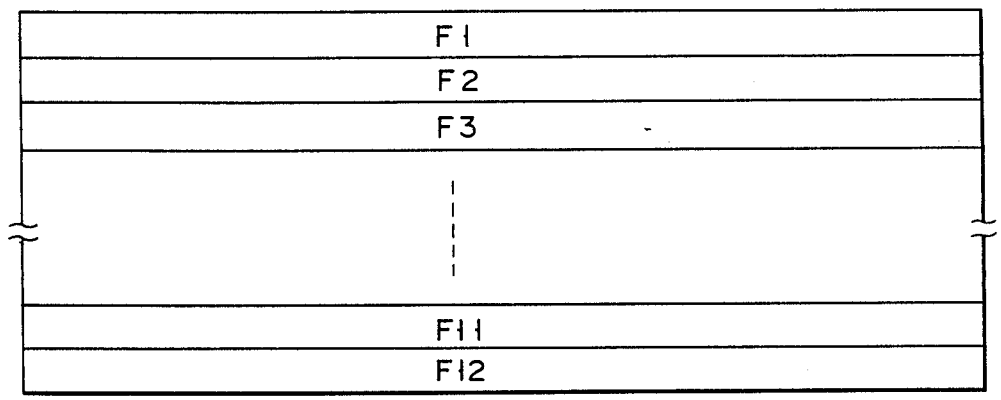
Figure 7C:
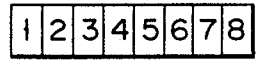

FIGS. 7A, 7B, and 7C show a format of the multiframe transmitted between the digital trunk circuit 22 and the channel service unit 23. That is, one bit for frame synchronization, i.e., an S bit is set and subsequently 8-bit speech data per channel are arranged for 24 channels to form one frame, and 12 such frames are arranged to form a multiframe. Signaling bits, i.e., communication control data are inserted in the 6th frame F6 and the 12th frame F12 of the multiframe.

The reception data of a multiframe format from the channel service unit 23 is supplied to the frequency conversion circuit 69 and the clock extractor 70 via the receiver 68 of the digital trunk circuit 22. The circuit 69 converts the reception data synchronous with a 1.544-MHz clock signal input via the receiver 68 into data synchronous with a 2.048-MHz clock signal. Communication control data in the converted data is supplied to the signaling bit extractor 73 and the alarm detector 77. In response to the communication control data extracted by the extractor 73, the CPU 67 converts the format of the communication control data so that the data can be transmitted to the data bus 35. The format-converted control data is supplied to the central processing section 36 via the data transceiver 66 and the data bus 35.

The speech data in the converted data is temporarily stored in the FIFO circuit 74. At this time, by enabling the buffer 76 in synchronism with a time slot corresponding to a channel assigned to the digital trunk circuit 22, the speech data stored in the circuit 74 is sent to the input highway 34-1. That is, the speech data is supplied from the circuit 74 to one channel assigned to the circuit 22 via the buffer 76. Thereafter, the speech data is supplied to the time division switch 37 and then to, e.g., the extension interface circuit 33 via the output highway 34-2.

Figure 8:
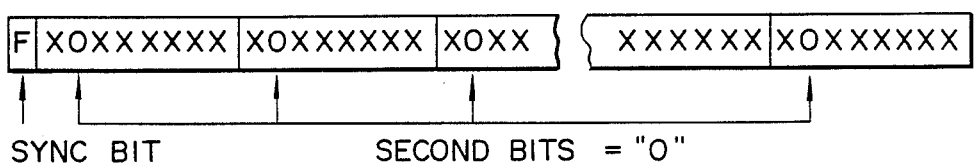
FIG. 8 is a view showing a format of error data.

If, for example, a failure such as step-out occurs between the channel service unit 23 and the digital network 24, the unit 23 transmits the signaling bits (alarm data) of a pattern as shown in FIG. 8 to the digital trunk circuit 22 in order to alarm occurrence of the failure to the circuit 22. In this alarm data, all second bits of 8-bit strings assigned to the respective channels are "0"s. This alarm data may be supplied via the digital line or generated in the unit 23. The alarm detector 77 checks from the alarm data the type and location of the failure. If the detector 77 detects that all the second bits of the 8-bit strings assigned to the respective channels are "0"s, the failure occurrence indication data is supplied to the CPU 67. In response to the failure occurrence indication data, the CPU 67 forms and outputs failure occurrence control data to the central processing section 36 via the data bus 35. In response to the failure occurrence control data, the section 36 controls the time division switch 37.

When the CPU 67 receives the failure occurrence control data, it determines that a failure has occurred between the channel service unit 23 and the digital network 24, and inverts the output from the Q terminal of the F/F 2 to be "0". As a result, in step S14, the NAND gate 3 is disabled, the output signal from the time slot counter 75 is not supplied to the tristate buffer 76, and the buffer 76 is not enabled. Therefore, the speech data from the FIFO circuit 74 is not transmitted to the input highway 34-1 via the buffer 76. Thereafter, step S8 is executed.

In step S8, the output signal "0" from the Q terminal of the flip-flop is supplied to the CS terminal of the speech memory 4 and the inverter 5. The inverter 5 receives the signal "0" and supplies a signal "1" to the NAND gate 6. Therefore, the NAND gate 6 is enabled. For this reason, the output signal from the counter 75 is supplied to the buffer 7 via the NAND gate 6, and the buffer 7 is enabled at a time slot occupied by one channel of the input highway assigned to the digital trunk circuit 22. The speech memory 4 is set in a state capable of outputting stored contents by receiving the signal "0" from the F/F 2 as an enable signal at the CS terminal. When the memory 4 is set in the output enable state by the enable signal, it sequentially transmits the speech data at an address designated by the counter 8 to the buffer 7. That is, the counter 8 receives the 8kHz sync signal and sequentially designates an address in the memory 4 in synchronism with the sync signal. In response to this, the memory 4 sequentially outputs the speech data at the designated address. At this time, as described above, the buffer 7 is enabled at the time slot occupied by the channel of the input highway assigned to the digital trunk circuit 22, and this time slot is repeated at a period of 8 kHz. Therefore, the speech data from the memory 4 is supplied to the input highway 34-1 via the buffer 7. The speech data is supplied to the switch 37 and then to the extension terminal 32 via the extension interface circuit 33. As a result, the speech message corresponding to the speech data can be heard at the terminal 32, and a user can reliably understand from the speech message that a failure has occurred between the channel service unit 23 and the digital network 24.

As described above, in this embodiment, if a failure occurs between the channel service unit 23 and the digital network 24, a speech message recorded in advance in the speech memory 4 of the digital trunk circuit 22 is transmitted to the extension terminal 32. Therefore, anyone can reliably know at the terminal 32 what kind of a failure has occurred.

When an outgoing call using the digital trunk circuit 22 in which a failure has occurred is supplied from an extension terminal to the central processing section 36, the section 36 may automatically connect the terminal to the analog trunk circuit 31 in accordance with failure occurrence control data from the CPU 67.

A second embodiment of the branch exchange system of the present invention will be described below. In the second embodiment, the same reference numerals as in the first embodiment denote the same parts and a detailed description thereof will be omitted.

Figure 10:
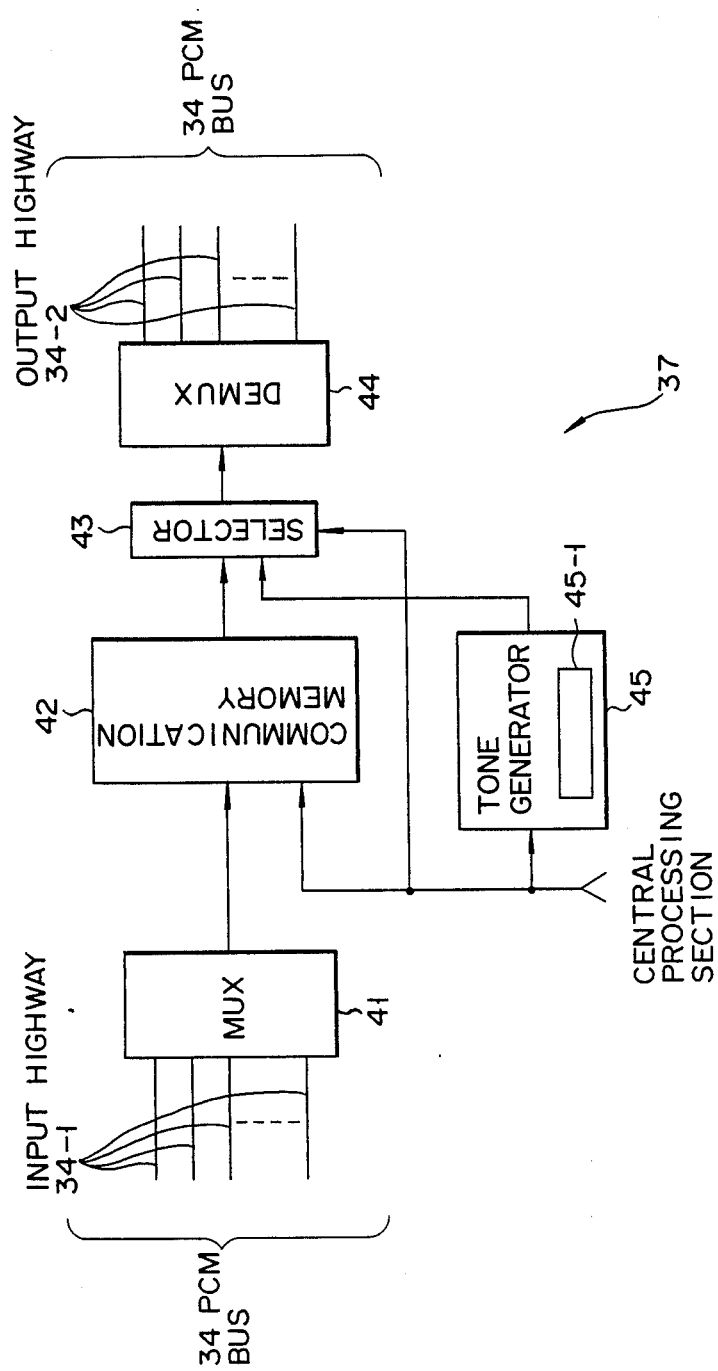
FIG. 10 is a block diagram showing a schematic arrangement of the time division switch shown in FIG. 2.
Figure 11:
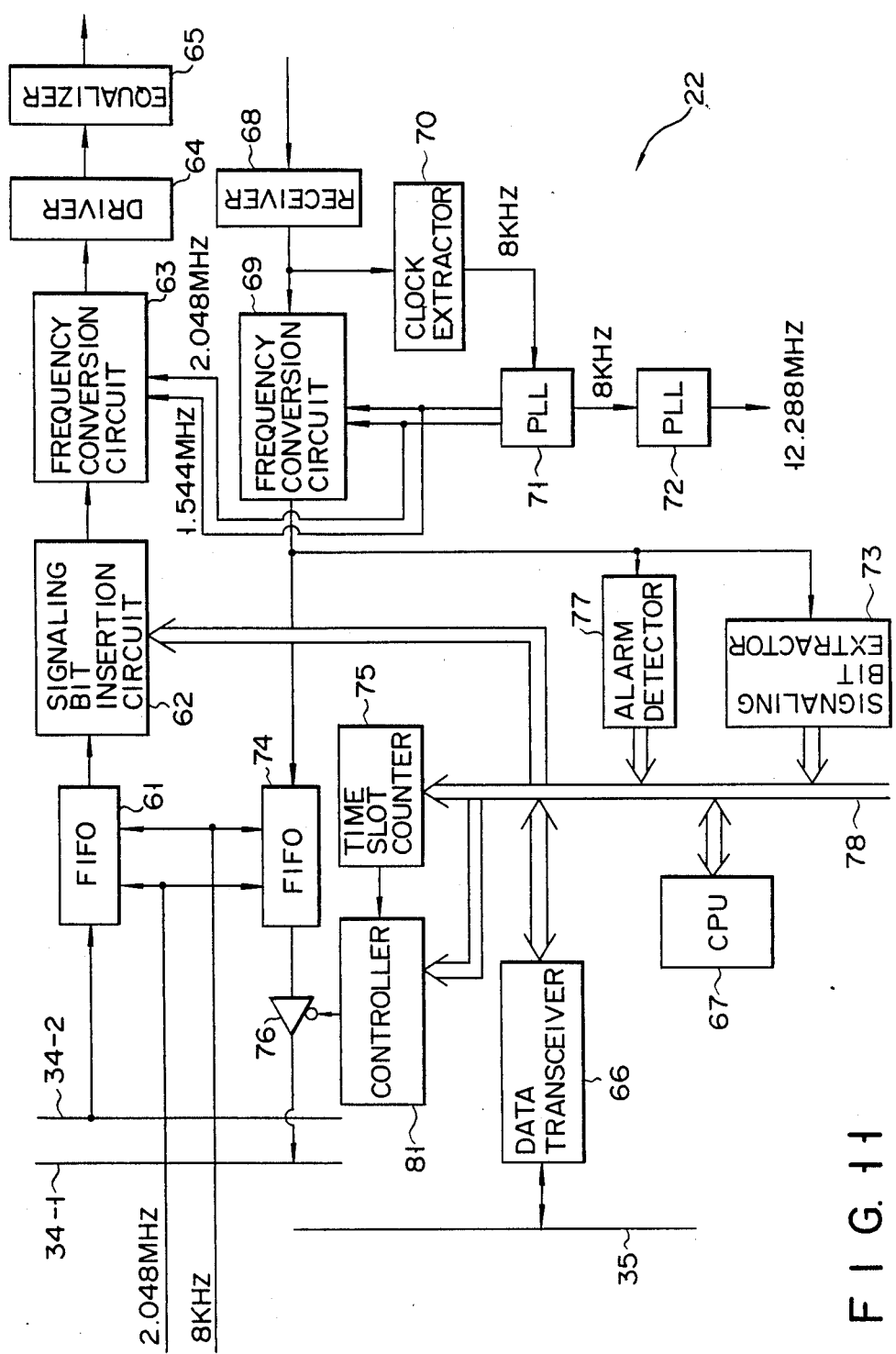
FIG. 11 is a block diagram showing an arrangement of the digital trunk circuit shown in FIG. 2.
Figure 12:
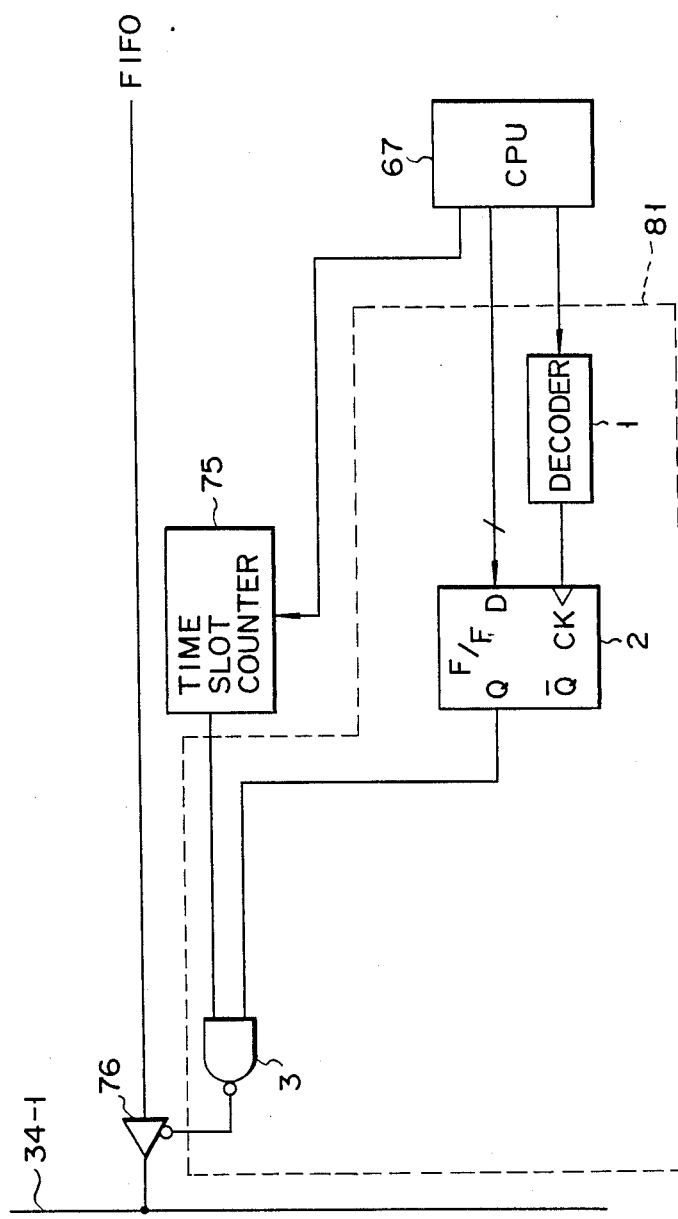
FIG. 12 is a block diagram showing an arrangement of the controller shown in FIG. 11.

As shown in FIG. 10, a tone signal generator 45 of a time division switch 37 includes a circuit 45-1 for generating a tone signal having a predetermined frequency in response to a specific tone generating instruction from a central processing section 36. As shown in FIG. 11, a digital trunk circuit 22 includes a controller 81 in place of a message generator/controller 80 and does not include a power-on detector 79. As shown in FIG. 12, the controller 81 includes a decoder 1, an F/F 2, and a NAND gate 3. As shown in FIG. 13, an extension terminal 32 includes a communication controller 101, a tone detector 102, a controller 103, a message memory 104, a loudspeaker 105, a driver 106, and an LCD 107.

Figure 14:
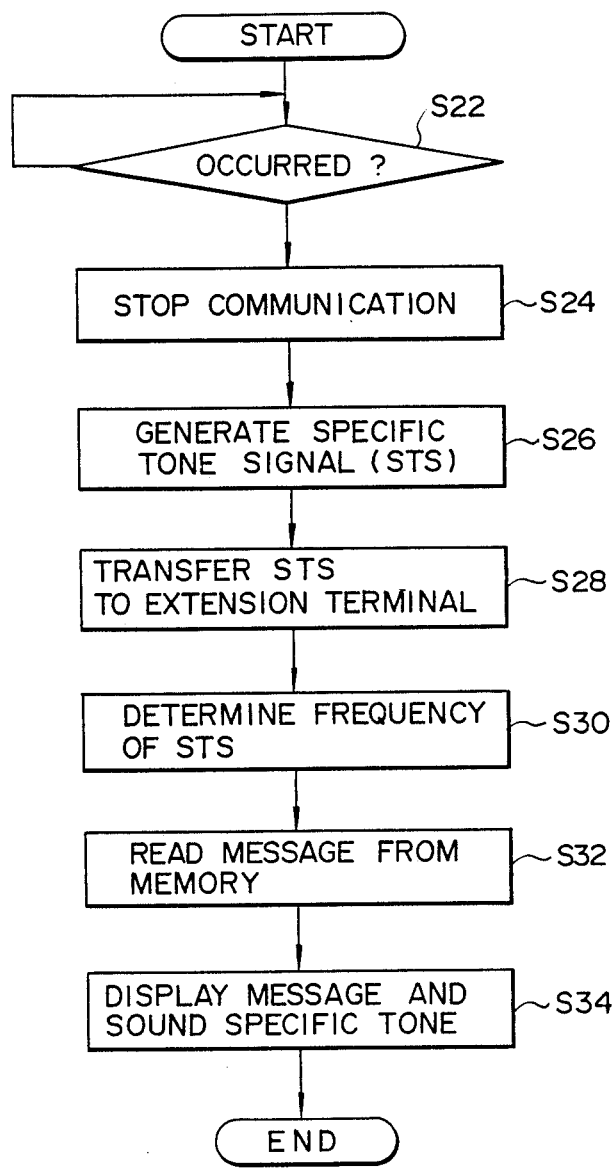
FIG. 14 is a flow chart for explaining an operation of the embodiment.

An operation of the second embodiment will be described below with reference to FIG. 14. Assume that communication is performed from the extension terminal 32 via a digital interface section as in the first embodiment. In step S22, an alarm detector 77 monitors occurrence of a failure from signaling bits. If occurrence of a failure is detected, the detector 77 outputs failure occurrence indication data to a CPU 67. Thereafter, step S24 is executed.

In step S24, communication is stopped. That is, in response to the failure occurrence indication data, the CPU 67 outputs failure occurrence control data to the central processing section 36. At the same time, a communication stop instruction and a signal of logic "0" are supplied to the decoder 1, the F/F 2, and the controller 81, respectively. As a result, as in the first embodiment, the NAND gate 3 is disabled, and speech data is not transmitted from a FIFO circuit 74 onto a PCM bus 34. In response to the failure control data from the CPU 67, the section 36 generates a specific tone transmission instruction.

In step S26, a specific tone signal having a predetermined frequency is generated by the circuit 45-1 of the tone generator 45 of the time division switch 37 and output to a selector 43. In step S28, in accordance with a selection instruction from the section 36, the selector 43 selects and outputs a specific tone signal in synchronism with a time slot corresponding to a channel used for reception by the terminal 32 to a demultiplexer 44. Thereafter, the specific tone signal is transmitted to the terminal 32 via the PCM bus 34 and the extension interface circuit 33.

In step S30, the terminal 32 checks the frequency of the tone signal received by the tone detector 102. If the received tone signal has a predetermined frequency, this information is supplied to the controller 103. In step S32, the controller 103 reads out a message from the message memory 104. In step S34, the readout message is displayed on the LCD (liquid crystal display device) 107 via the driver 106. The tone signal is externally output as a sound by the loudspeaker 105.

In this manner, the extension terminal 32 generates an alarm sound corresponding to the specific tone signal so that an operator can recognize the failure between the channel service unit 23 and the digital network 24.

What is claimed is:
1. A private branch exchange system for connecting a plurality of extension terminals to a digital network via a digital trunk circuit and a channel service unit, comprising:
   detecting means for detecting a condition between said digital trunk circuit and said digital network;
   means for generating a message generation instruction in response to a detection result by said detecting means indicating that a failure occurs between said digital trunk circuit and said digital network;
   message generating means in said digital trunk circuit, for generating an indication message; and
   means for calling a specific terminal of said plurality of extension terminals, said specific terminal being predetermined, and for transmitting the generated message to said specific terminal under a response of said called specific terminal.

2. A system according to claim 1, wherein said detecting means includes means for detecting a step-out as the failure.

3. A system according to claim 1, wherein said message generating means includes memory means for storing the indication message.

4. A system according to claim 1, further comprising means for causing a communication to stop when said specific terminal is on the communication.

5. A private branch exchange system for connecting a plurality of extension terminals to a digital network via a digital trunk circuit and a channel service unit, comprising:
   message generating means in said digital trunk circuit, for generating a message in response to an input message generation instruction generated under a predetermined condition; and
   transmitting means for transmitting the message to a specific extension terminal of said plurality of extension terminals.

6. A system according to claim 5, wherein the predetermined condition is that a failure of a step-out occurs between said digital trunk circuit and said digital network, a pattern of signaling bits in a multiframe used in communication between said digital trunk circuit and said digital network indicates occurrence of the failure, and
   said digital trunk circuit further comprises alarm detecting means for generating the message generation instruction in accordance with the pattern of the signaling bits.

7. A system according to claim 6, wherein
   said specific extension terminal exchanges data with said digital network via said digital trunk circuit and said channel service unit, and said transmitting means includes means for stopping transmission of the data and transmitting the message to said specific extension terminal via a path used for transmission of the data.

8. A system according to claim 6, further comprising means for calling, when said specific extension terminal is on-hooked, said specific extension terminal, in response to the message generation instruction.

9. A system according to claim 6, further comprising means for calling, when a power source is detected as ON, said specific extension terminal, in response to the message generation instruction.

10. A method of informing an extension terminal in a private branch exchange system of occurrence of a failure between a digital trunk circuit and a digital network, comprising:
performing communication between said extension terminal and said digital network;
monitoring the occurrence of the failure during the communication; and
alarming occurrence of the failure to said extension terminal when the failure is detected.

11. A method according to claim 10, wherein said alarming step includes:
generating an alarm generation instruction in said digital trunk circuit in response to the detection of the failure; and
stopping the communication and transmitting an alarm to said extension terminal in response to the detection of the failure.

12. A method according to claim 11, wherein the alarm is a tone signal having a predetermined frequency.

13. A method according to claim 12, wherein said alarming step includes:
receiving the tone signal;
checking whether a frequency of the tone signal is a predetermined frequency; and
outputting a sound in accordance with the tone signal when it is determined that the tone signal has the predetermined frequency.

14. A method according to claim 12, wherein said alarming step includes:
receiving the tone signal;
checking whether a frequency of the tone signal is a predetermined frequency; and
outputting an audio message in accordance with the tone signal when it is determined that the tone signal has the predetermined frequency.

15. A method according to claim 12, wherein said alarming step includes:
receiving the tone signal;
checking whether a frequency of the tone signal is a predetermined frequency; and
displaying a message in accordance with the tone when it is determined that the tone signal has the predetermined frequency.

16. A method according to claim 12, wherein
when the failure occurs, a pattern of signaling bits in a multiframe used in communication between said digital trunk circuit and said digital network indicates a predetermined pattern, and
said monitoring step includes generating the alarm in accordance with the pattern of the signaling bits.

17. A private branch exchange system having a channel service unit and capable of alarming occurrence of a failure between a digital trunk circuit and a digital network to an extension terminal, comprising: communicating means for performing communication between said extension terminal and said digital network;
failure detecting means for monitoring the occurrence of the failure between said digital trunk circuit and said digital network during the communication; and
alarming means for alarming the occurrence of the failure to said extension terminal when the failure is detected by said failure detecting means.

18. A system according to claim 17, wherein said alarming means includes:
means for generating an alarm generation instruction in response to the detection of the failure; and
transmitting means for stopping the communication and transmitting an alarm to said extension terminal in response to the detection of the failure.

19. A system according to claim 18, wherein said alarming means includes means for generating as the alarm a tone signal having a predetermined frequency.

20. A system according to claim 19, wherein said extension terminal includes:
means for receiving the tone signal;
means for checking whether a frequency of the tone signal is the predetermined frequency; and
means for outputting a sound in accordance with the tone signal when it is determined by said checking means that the tone signal has the predetermined frequency.

21. A system according to claim 19, wherein said extension terminal includes:
means for receiving the tone signal;
means for checking whether a frequency of the tone is the predetermined frequency; and
means for outputting an audio message in accordance with the tone signal when it is determined by said checking means that the tone signal has the predetermined frequency.

22. A system according to claim 19, wherein said extension terminal includes:
means for receiving the tone signal;
means for checking whether a frequency of the tone is the predetermined frequency; and
means for displaying a message in accordance with the tone signal when it is determined by said checking means that the tone signal has the predetermine frequency.

23. A system according to claim 17, wherein
when the failure occurs, a pattern of signaling bits in a multiframe used in communication between said digital trunk circuit and said digital network exhibits a predetermined pattern, and
said alarming means includes means for generating the alarm in accordance with the pattern of the signaling bit.

* * * * *